(12) United States Patent
Corston-Oliver et al.

(10) Patent No.: US 7,788,086 B2
(45) Date of Patent: Aug. 31, 2010

(54) METHOD AND APPARATUS FOR PROCESSING SENTIMENT-BEARING TEXT

(75) Inventors: Simon H. Corston-Oliver, Seattle, WA (US); Anthony Aue, Seattle, WA (US); Eric K. Ringger, Issaquah, WA (US); Michael Gamon, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 748 days.

(21) Appl. No.: 11/105,619

(22) Filed: Apr. 14, 2005

(65) Prior Publication Data

US 2006/0200341 A1    Sep. 7, 2006

Related U.S. Application Data

(60) Provisional application No. 60/657,629, filed on Mar. 1, 2005.

(51) Int. Cl.
G06F 17/20    (2006.01)
G06F 17/27    (2006.01)
G06F 17/21    (2006.01)

(52) U.S. Cl. ................... 704/9; 704/1; 704/10

(58) Field of Classification Search .......... 704/1, 704/9, 10; 707/101, 102
See application file for complete search history.

(56) References Cited

U.S. PATENT DOCUMENTS

| | | | |
|---|---|---|---|
| 5,870,701 A | 2/1999 | Wachtel | |
| 6,006,183 A * | 12/1999 | Lai et al. | 704/235 |
| 6,742,003 B2 * | 5/2004 | Heckerman et al. | 707/104.1 |
| 6,981,000 B2 | 12/2005 | Park et al. | |
| 6,987,987 B1 * | 1/2006 | Vacanti et al. | 455/556.2 |
| 7,028,250 B2 * | 4/2006 | Ukrainczyk et al. | 715/202 |
| 7,130,777 B2 * | 10/2006 | Garg et al. | 703/2 |
| 7,143,089 B2 * | 11/2006 | Petras et al. | 707/5 |
| 7,185,065 B1 | 2/2007 | Holtzman et al. | 707/7 |
| 7,249,312 B2 * | 7/2007 | Jasper et al. | 715/205 |
| 7,624,102 B2 * | 11/2009 | Watson | 707/4 |
| 2004/0049534 A1 * | 3/2004 | Nickerson et al. | 709/203 |
| 2004/0083270 A1 * | 4/2004 | Heckerman et al. | 709/207 |
| 2004/0172272 A1 * | 9/2004 | Shillinglaw et al. | 705/1 |
| 2005/0034071 A1 * | 2/2005 | Musgrove et al. | 715/530 |
| 2005/0091038 A1 * | 4/2005 | Yi et al. | 704/10 |
| 2005/0125216 A1 * | 6/2005 | Chitrapura et al. | 704/1 |
| 2005/0209909 A1 * | 9/2005 | Dull et al. | 705/10 |

(Continued)

FOREIGN PATENT DOCUMENTS

JP    2003281161 A    10/2003

OTHER PUBLICATIONS

Roussinov, D., Zhao, J.L. (2003) "Message Sense Maker: engineering a tool set for customer relationship management" Proc. of 36th Annual Hawaii International Conference on System Sciences (HICSS).*

(Continued)

*Primary Examiner*—David R Hudspeth
*Assistant Examiner*—Paras Shah
(74) *Attorney, Agent, or Firm*—Westman, Champlin & Kelly, P.A.

(57) ABSTRACT

The present invention provides a system for identifying, extracting, clustering and analyzing sentiment-bearing text. In one embodiment, the invention implements a pipeline capable of accessing raw text and presenting it in a highly usable and intuitive way.

9 Claims, 7 Drawing Sheets

U.S. PATENT DOCUMENTS

| | | | |
|---|---|---|---|
| 2006/0129446 A1* | 6/2006 | Ruhl et al. | 705/10 |
| 2006/0200341 A1 | 9/2006 | Corston-Oliver et al. | 704/5 |
| 2006/0200342 A1* | 9/2006 | Corston-Oliver et al. | 704/10 |
| 2006/0282336 A1* | 12/2006 | Huang | 705/26 |

OTHER PUBLICATIONS

Dave, K., Lawrence, S., and Pennock, D. M. "Mining the peanut gallery: Opinion extraction and semantic classification of product reviews." In Proc. of the 12th Int.WWW Conf., 2003.*

Hu, M. and Liu, B. "Mining and Summarizing Customer Reviews." In KDD, pp. 168-177, Seattle, WA. 2004.*

M. Hu and B. Liu. Mining opinion features in customer reviews. In Proc. AAAI, 2004.*

J. Yi, T. Nasukawa, R. Bunescu & W. Niblack. 2003. Sentiment Analyzer: Extracting Sentiments about a Given Topic using Natural Language Processing Techniques. In Proceedings of the 3rd IEEE International Conference on Data Mining, pp. 1-8.*

Kim, S. and Hovy, E. 2004. Determining the sentiment of opinions. In Proceedings of the 20th international Conference on Computational Linguistics (Geneva, Switzerland, Aug. 23-27, 2004). International Conference On Computational Linguistics. Association for Computational Linguistics, Morristown, NJ, 1367.*

S. Bethard, H. Yu, A. Thornton, V. Hativassiloglou & D. Juraf-sky. 2004. Automatic extraction of opinion propositions andtheir holders. In Proceedings of AAAI Spring Symposium onExploring Attitude and Affect in Text.*

Kamal Nigam, et al. (2000) Text Classification from Labeled and Unlabeled Documents using EM. In: Machine Learning 39 (2/3), pp. 103-134.

Bo Pang, et al., (2002) Thumbs up? Sentiment Classification using Machine Learning Techniques. Proceedings of EMNLP 2002, pp. 79-86.

Sarwar et al. "Recommender Systems for Large-Scale E-Commerce: Scalable Neighborhood Formation Using Clustering". In Proceedings of the 5$^{th}$ International Conference on Computer and Information Technology (ICCIT 2002), 2002 pp. 1-6.

U.S. Appl. No. 11/105,624, filed Apr. 14, 2005, entitled, "System for Processing Sentiment-Bearing Text".

Office Action for U.S. Appl. No. 11/105,624, mailed Apr. 16, 2008.

Office Action for U.S. Appl. No. 11/105,624, mailed Oct. 24, 2008.

Office Action for U.S. Appl. No. 11/105,624, mailed Jun. 10, 2009.

Final Office Action for U.S. Appl. No. 11/105,624, mailed Dec. 16, 2009.

Bai et al. "Sen-timent extraction from unstructured text using tabu search enhanced markov blanket,"In Proceedings of the International Workshop on Mining for and from the Semantic Web, Jul. 2004, pp. 24-35.

Gabrilovich et al. "Text Categorization with many redundant features: Using Aggressive feature selection to make SVMs competitive with C4.5". In ICML '04, Aug. 2004, pp. 321-328.

Notice of Allowance dated Apr. 15, 2010 for related case U.S. Appl. No. 11/105,624, filed Apr. 14, 2005.

* cited by examiner

METHOD AND APPARATUS FOR PROCESSING SENTIMENT-BEARING TEXT

The present application is based on and claims the benefit of U.S. provisional patent application Ser. No. 60/657,629, filed Mar. 1, 2005, the content of which is hereby incorporated by reference in its entirety.

BACKGROUND OF THE INVENTION

The present invention deals with text processing. More specifically, the present invention deals with identifying, extracting, clustering and analyzing sentiment-bearing text.

In the past, discerning the sentiment of large volumes of text has been very time consuming. In addition, providing information indicative of the sentiment, and processing that information in any relatively granular way has also been very cumbersome and difficult. One example of this type of information, which will be discussed for the sake of example, is customer review, or customer feedback information which provides customer sentiment as to particular products or services that the customer has purchased.

Customer reviews of products can contain very important and beneficial information for both consumers of the product and for the company manufacturing and selling the product. A consumer may wish to review such information in order to make a purchasing decision. For instance, the consumer may wish to determine what other purchasers of the product think of the product, and specifically what other purchasers might think of certain specific features of the product. If the consumer were buying an automobile, for instance, and the most important thing to the consumer was the handling of the automobile (as opposed to, for example, aesthetics of the automobile) it would be very beneficial to the consumer to have access to customer reviews of that feature (e.g., the handling) of that particular product (e.g., the particular make and model of automobile of interest to the consumer).

This type of information can also be very useful to the company manufacturing and selling the product. The company may wish to know what consumers like and dislike about the product in order to redesign the product, or simply in order to generate a desired marketing campaign or to further define a target consumer for the product. For instance, an executive at an automobile manufacturer may wish to know what the consumers most like, and most dislike, about the certain makes and models of the automobiles being manufactured and sold by the company. This can help the executive to make decisions in redesigning and marketing those makes and models of automobiles.

In the past, it has been very difficult to review and gain meaningful insight into this type of information to determine exactly how consumers perceive products. This is particularly true given the ease with which consumers can provide feedback in the age of electronic communication. The volume of accumulated data which contain consumer feedback regarding products is very large. In the past, obtaining any type of meaningful information from that feedback data has required human analysis of the feedback. Humans have been required to read all the information or a sample of it and then generate certain types of summaries or reports. Of course, this can be very time consuming and expensive, particularly given the volume of consumer feedback for certain products.

The following is simply an exemplary list of the sources which can provide consumer feedback: electronic mail, electronic feedback channels provided at a company's website, chat room text devoted to the products of a given company, bulletin boards or discussion forums, websites devoted to reviewing products of certain companies, blogs (which, in general, represent frequent and chronological publication of personal thoughts and web links from an individual or other entity); and other electronically available articles, papers, newspaper reviews, or other similar documents that represent the opinion or sentiment of consumers or reviewers of products. With all these sources of information, the amount of information that reviews certain nationally known, or internationally known, products, can be staggering. The process of analyzing and processing such information into a meaningful report format can also be very difficult.

SUMMARY OF THE INVENTION

The present invention provides a system for identifying, extracting, clustering and analyzing sentiment-bearing text. In one embodiment, the invention implements a pipeline capable of accessing raw text and presenting it in a highly usable and intuitive way.

DETAILED DESCRIPTION OF ILLUSTRATIVE EMBODIMENTS

The present invention relates to a system for processing sentiment-bearing text. In one embodiment, the system identifies, extracts, clusters and analyzes the sentiment-bearing text and presents it in a way which is highly useable by the user. While the present invention can be used to process any sentiment-bearing text, the present description will proceed primarily with respect to processing product review information provided by consumers or reviewers of products. However, that exemplary context is intended to in no way limit the scope of the invention. Prior to describing the invention in greater detail, one illustrative environment in which the invention can be used will be discussed.

Figure 1:
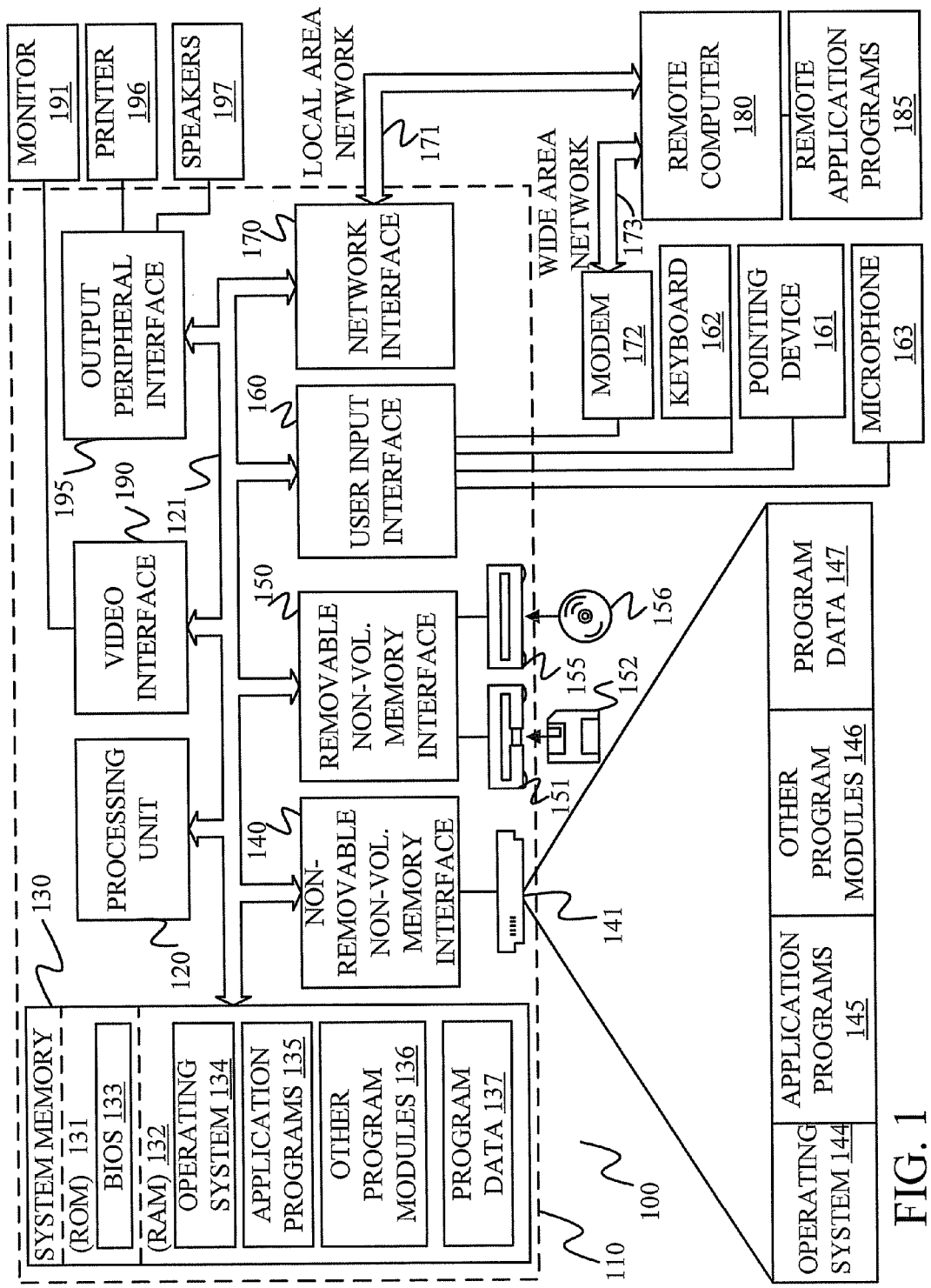
FIG. 1 is a block diagram of one embodiment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2A:
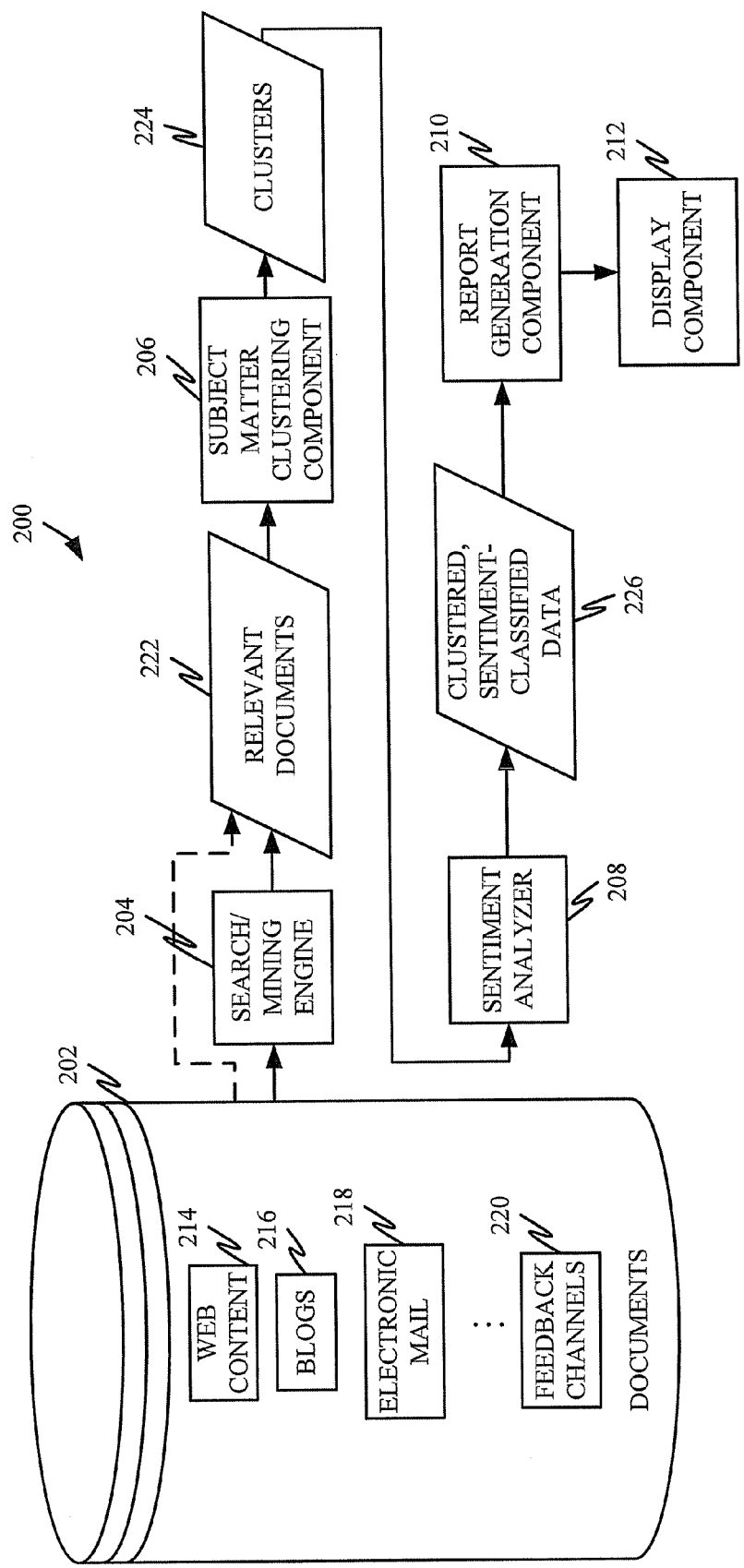
FIG. 2A is a block diagram of a system for processing sentiment-bearing text in accordance with one embodiment of the present invention.

FIG. 2A shows a block diagram of a text processing system 200 in accordance with one embodiment of the present invention. Text processing system 200 is operatively connected to document data store 202. System 200 includes search and mining engine 204, subject matter clustering component 206, sentiment analyzer 208, report generation component 210 and display component 212. System 200 also shows optional data store 213.

While document data store 202 is shown in FIG. 2A as a single data store, it will be appreciated that it may illustratively include data from a wide variety of different sources that may be stored on a wide variety of different physical data stores. Examples of the types of sources for content of data store 202 include articles, newsgroup postings, web pages, or other web content 214, blogs 216, electronic mail messages 218, and feedback channels 220 that are provided as part of a company's web presence. Of course, many other sources of electronic documents can be provided and included as part of the document set shown on data store 202. Those mentioned are simply provided by way of example.

Figure 2B:
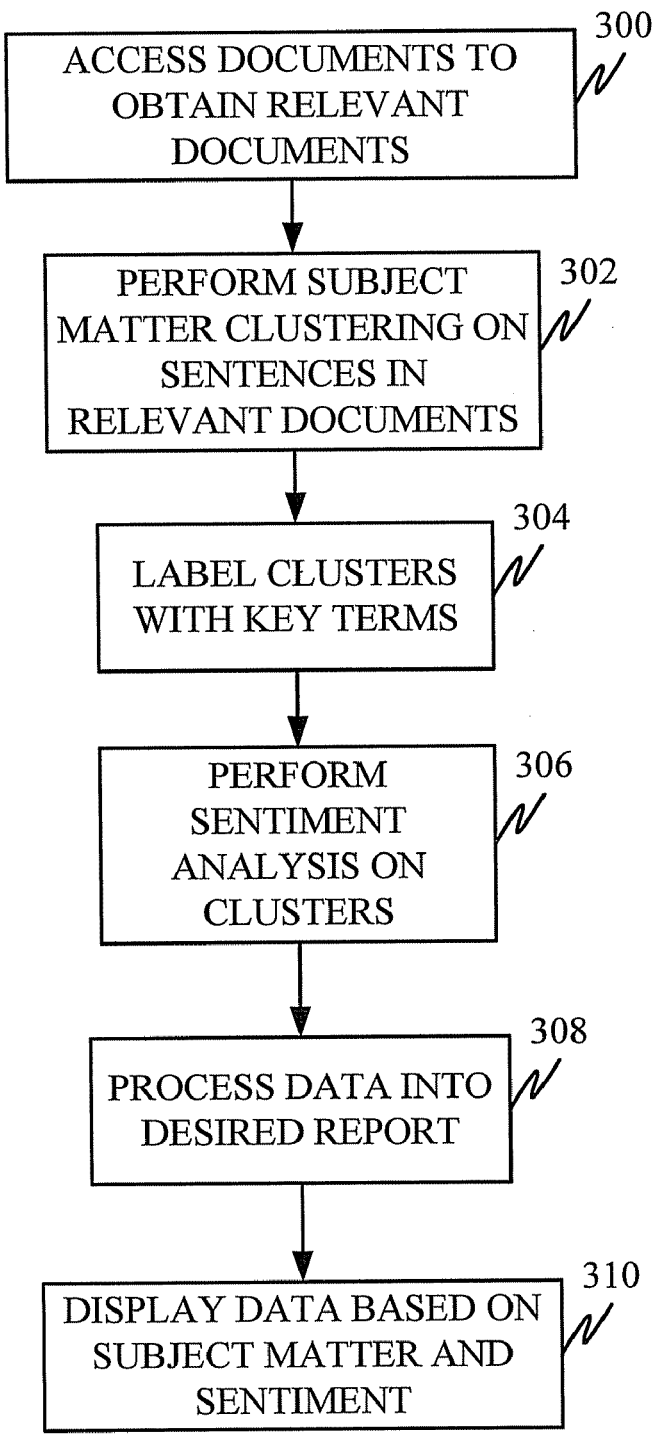
FIG. 2B is a flow diagram illustrating exemplary operation of the system shown in FIG. 2A.

FIG. 2B illustrates one illustrative embodiment of the operation of the system shown in FIG. 2A. Referring again to FIG. 2A, Search and mining engine 204 first accesses documents 202 (whether they are stored on a single data store, on a plurality of different data stores across the web, on a local network, or in any other type of storage arrangement) and identifies relevant documents 222. Engine 204 can illustratively be a commercially available web crawler, which periodically crawls the web to identify relevant content based on identifiers (such as key words, terms, or other identifiers descriptive of relative content) provided by a user. Engine 204 can also include a commercially available search engine which periodically conducts searches for relevant documents.

Relevant documents 222 can include documents having any desired measure of relevance, as indicated by the user. For instance, engine 204 may provide a relevance indicator, or confidence measure, indicative of the relevance of a document to a set of key words. The documents will be considered relevant documents 222 if that measure reaches a threshold determined by the user.

An example will be used to enhance understanding of the invention. Assume that the user wishes to analyze a wide variety of feedback and other documents related to a particular model of sports car manufactured by the ACME Corporation. In that case, search and mining engine 204 accesses the sources of documents 202 and finds documents related to the identified model sports car manufactured by the ACME Corporation. As discussed above, those documents can be any of a wide variety of different documents obtained from any of a wide variety of different sources. Search and mining engine 204 identifies the documents and provides them (or at least provides an indication of where they are located) as relevant document set 222. Accessing the documents to obtain relevant documents is indicated by block 300 in FIG. 2B.

In an alternative embodiment, search and mining engine 204 is not needed. For instance, if the desired documents are only those provided through a known taxonomy on a consumer review web page, where the web page is selected by the user as relating specifically to the desired model of the sports car manufactured by the ACME Corporation, then all documents on that web page are relevant and that entire set of documents can be downloaded as the set of relevant documents 222.

In either case (where search and mining engine 204 is used or where it is not used) relevant documents 222 have been identified as relevant to the subject matter for which analysis is to be performed. The documents 222 are then provided to subject matter clustering component 206.

Subject matter clustering component 206 adds structure to the document set 222. Component 206 processes and clusters sentences in the relevant documents 222 into desired clusters 224 based on subject matter. Therefore, each cluster contains sentences that are relevant to a given subject matter. The text in each cluster is to be analyzed based on sentiment.

Continuing with the present example, assume that the user wishes to know consumer sentiment regarding a variety of different features of the sports car manufactured by the ACME Corporation. For instance, assume that the user wishes to know user sentiment regarding steering (or handling), gas mileage, acceleration, and safety. In that case, subject matter clustering component 206 clusters sentences in relevant documents 222 into the predefined clusters, one cluster corresponding to each feature for which the user desires a sentiment analysis.

In accordance with one embodiment, clustering component 206 need not cluster each sentence, but illustratively clusters at a finer granularity than at the level of entire documents. For example, clustering component 206 may illustratively cluster individual sentences of the documents, or paragraphs, or other sub-document linguistic units, into the desired clusters. In the example discussed herein, it will be assumed that subject matter clustering component 206 clusters the individual sentences of the documents.

Therefore, component 206 provides clusters 224 of sentences, wherein each cluster is related to a predefined feature. Thus, for instance, a first cluster might include sentences related to the handling of the sports car, while a second cluster might include sentences related to gas mileage, another cluster might include sentences related to safety, etc. Performing subject matter clustering on the relevant documents 222 is indicated by block 302 in FIG. 2B.

It will of course be appreciated that clustering component 206 need not only cluster based on the actual content of the document. Instead, clustering component 206 may cluster based on the author. For instance, if the user wishes to know the sentiment of a particularly well-known user of products (or reviewer of products) the user may well wish to have a cluster devoted to documents composed by that author.

In one embodiment, subject matter clustering component 206 illustratively performs natural language processing to identify sentences within relevant documents 222 that should be included in each cluster. In any case, clusters 224 are output by clustering component 206. Clustering component 206 is illustratively a commercially available text clustering component.

In one illustrative embodiment, the clusters 224 are also annotated with the key terms that were used to form the clusters. This can be done in a wide variety of different ways and may simply be done with an identifier field that includes the key terms used by clustering component 206 to generate the clusters. Labeling the clusters with key terms is indicated by block 304 in FIG. 2B.

Figure 5:
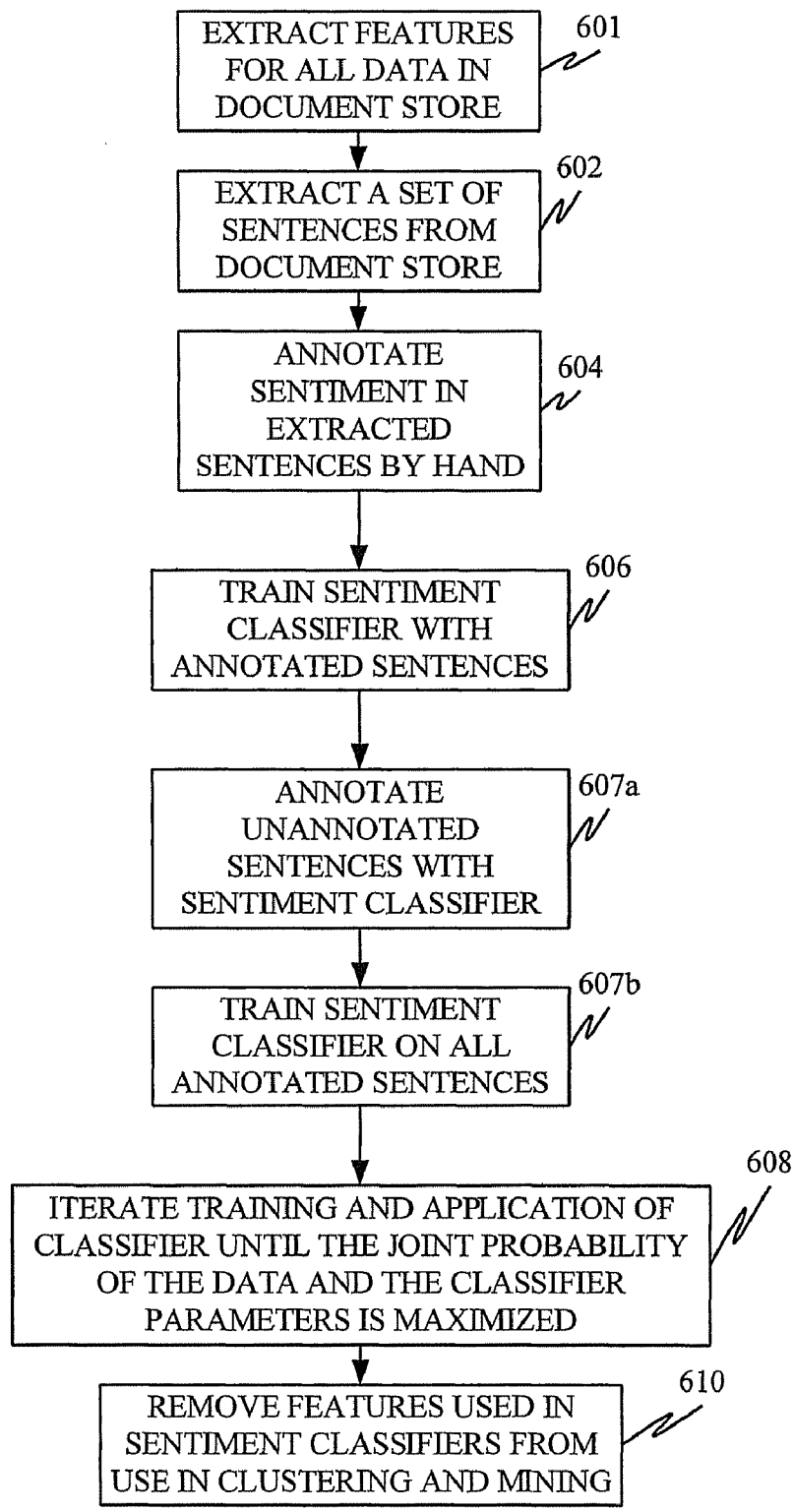
FIG. 5 is a block diagram illustrating a method by which a sentiment analyzer is trained in accordance with one embodiment of the present invention.

Clusters 224 are provided to sentiment analyzer 208. Sentiment analyzer 208 is also illustratively a commercially available sentiment analyzer, such as one based on a naïve Bayes classifier, support vector machines, decision trees, etc. While the present example discusses analyzing sentences for sentiment, this analysis can be performed on linguistic units of different levels of granularity as well. One embodiment for training sentiment analyzer 208 is described below with respect to FIG. 5. Suffice it to say, for now, that sentiment analyzer 208 is trained to identify whether the sentences (or other linguistic units) in clusters 224 are positive, negative, or neutral with respect to sentiment. Of course, this can vary as well and sentiment analyzer 208 can provide a wider range of sentiment analysis (such as very positive, positive, neutral, negative and very negative, etc.). Sentiment analyzer 208 thus provides a sentiment label associated with each of the individual sentences in the clusters 224. This information is output as clustered, sentiment-classified data 226. Performing sentiment analysis on the clusters is indicated by block 306 in FIG. 2B.

Report generation component 210 then processes the data 226 into any desired form. Component 210 can illustratively be a commercially available data processor that aggregates and prepares the sentiment-classified data 226 for display, as desired by a user. Processing the data into a desired report format is indicated by block 308 in FIG. 2B.

The processed data is then provided to display component 212 which displays the processed data for review by the user. In one embodiment, the data is displayed based on its subject matter and sentiment. This is indicated by block 310 in FIG. 2B.

In accordance with one embodiment of the invention, the clustered, sentiment-classified data 226 is stored in data store 213 for later use. Data store 213 can be a separate data store or the same as store 202. Therefore, in one embodiment, relevant documents 222 (or clusters 224) are retrieved from data store 213, subjected to further processing in system 200, and the data store 213 is then re-populated with the newly processed information.

Figure 3:
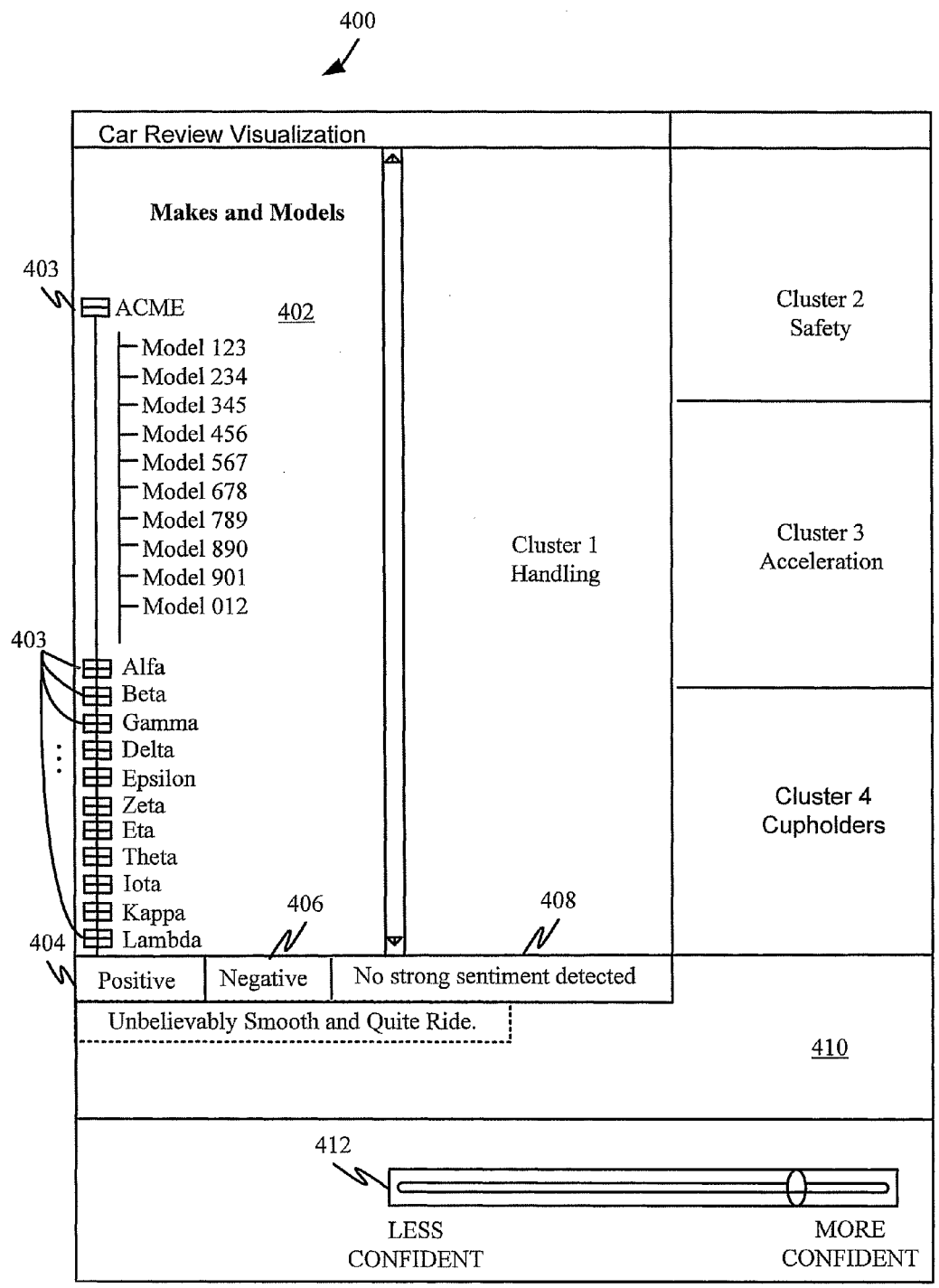
FIG. 3 shows a user interface in accordance with one embodiment of the present invention.

FIG. 3 shows one illustrative display of the clustered, sentiment-classified data 226, after it has been analyzed and processed by component 210. Of course, the data can be displayed in a wide variety of ways, and the particular display 400 shown in FIG. 3 is but one exemplary embodiment for displaying the information to the user.

FIG. 3 shows that display 400 illustratively includes a tree view of all of the data represented by display 400 in tree view field 402. It can be seen that FIG. 3 shows a plurality of car manufacturers 403 in the tree view. When one of the car manufacturers is selected (such as ACME as shown in FIG. 3) the tree view expands to show all of the models for which data has been processed relative to ACME automobiles.

The user then selects one of the individual models in tree view field 402 and a plurality of clusters associated with that model appear on the right side of display 400. The clusters are labeled in FIG. 3 as clusters 1-4.

Illustratively, the size of the box (or field on the display) representing each cluster is indicative of the number of sentences (or other linguistic units) which are contained in that cluster. For instance, display 400 shows that cluster 1 (the cluster associated with the handling of the car) is the largest. Therefore, the number of sentences in that cluster is the largest of all displayed clusters. Display 400 also shows that cluster 2 (related to safety) is the smallest and therefore the number of sentences in that cluster is the smallest of all of the clusters displayed.

In addition, an indicator is also illustratively provided which indicates the overall, or average sentiment for each cluster. For instance, if the average sentiment of the sentences in the "handling" cluster is positive, then the cluster may be shaded in blue, whereas if the overall sentiment of the sentences in the cluster is negative, then it may be shaded in red. Of course, the intensity of the shade can also represent how positive or negative the sentiment is that is represented by the cluster. If the sentiment expressed by the sentences in the cluster is very strongly negative, then the shading may be dark red, etc.

In addition, in one embodiment, the user is able to see the key terms used to generate the cluster. For example, if the user hovers the computer pointing device (e.g., the cursor) over a given cluster, then a window displays the key terms used in generating that cluster. Of course, a wide variety of other mechanisms can be used to show the user all of these features including the number of sentences in the cluster, the average sentiment in the cluster, the key terms used to generate the cluster, etc.

In order to view the content of a cluster, in the embodiment shown in FIG. 3, the user simply selects one of the cluster boxes by placing the cursor over the box and clicking. The user then actuates one of the tabs 404, 406, or 408. For instance, assume that the user highlights the "handling" cluster and then actuates tab 404 which corresponds to the sentences in the cluster that reflect a positive sentiment. Those sentences then illustratively appear in sentence field 410. The sentence "Unbelievably smooth and quiet ride." is thus displayed in field 410. Of course, if there were additional sentences in the cluster that expressed positive sentiment, they would also be displayed in field 410 and appropriate scrolling features would be provided to allow the user to view all of the sentences, even if there were too many to display at any one time in field 410.

FIG. 3 also shows another feature on display 400. A confidence slider 412 is shown at the bottom of display 400. Confidence slider 412 is illustratively a slider that can be set by the user to indicate the desired confidence level for sentences in the clusters. For instance, the sentiment analyzer 208 illustratively provides a confidence measure associated with the sentiment analysis for each of the sentences. If sentiment analyzer 208 is highly confident in the sentiment attributed to a given sentence, then the confidence measure will be higher. On the other hand, if sentiment analyzer 208 is not as confident with respect to the sentiment attributed to a given sentence, then the confidence measure will be lower.

The user can select the desired confidence level for sentences used in the clusters 1-4 by moving slider 412. Therefore, for instance, if the user wishes the clusters to be formed only of sentences for which the attributed sentiment was assigned with a high degree of confidence, then the user can move the slider toward the "more confident" end. If the user desires to have more data, but does not care as much about how confident sentiment analyzer 208 was in attributing sentiment to each sentence, then the user can move the slider toward the "less confident" end. This will populate the clusters with more sentences, but the sentiment attributed to those sentences will have a lower confidence score.

Figure 4A:
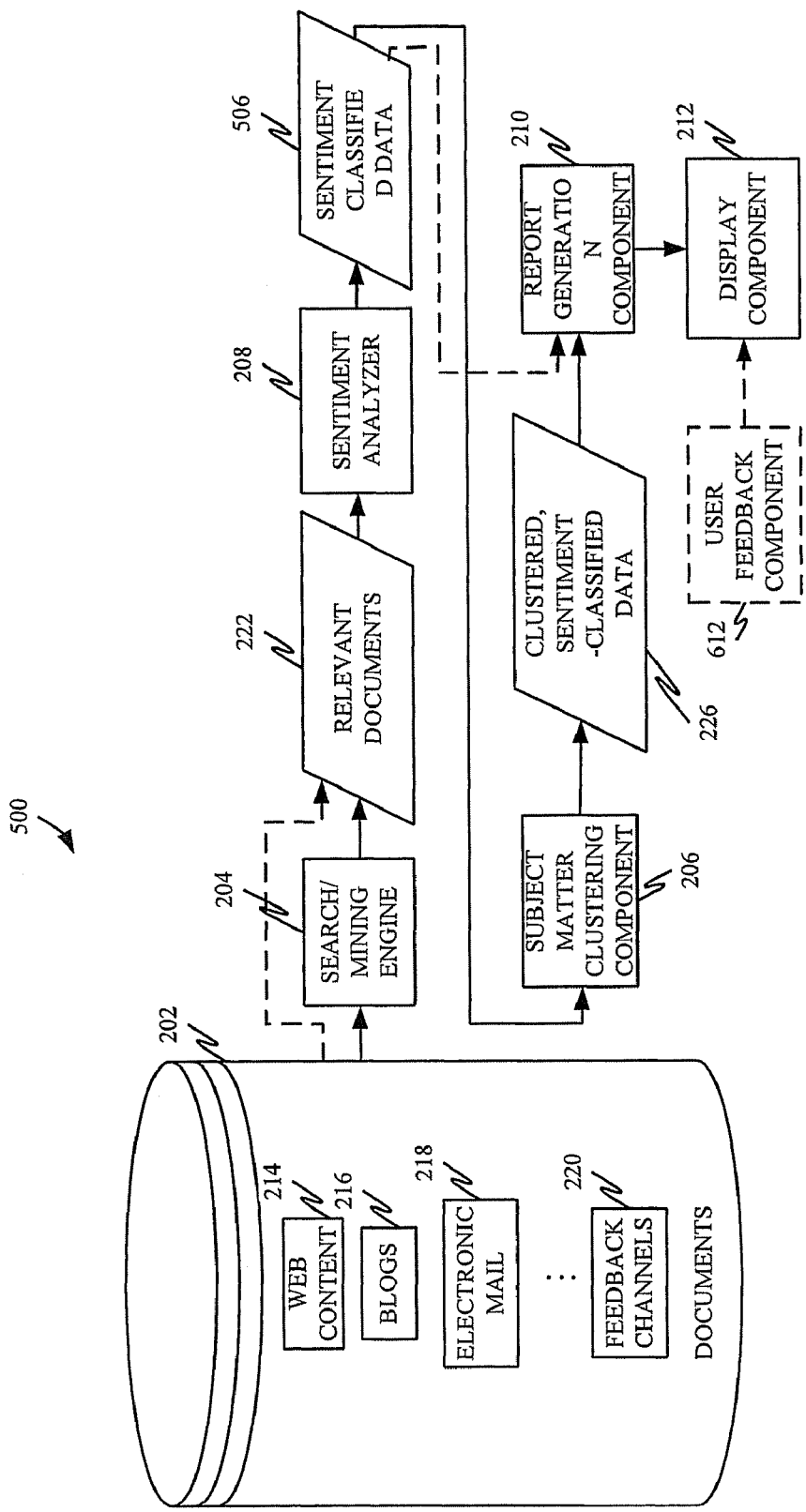
FIG. 4A is a block diagram of a system for processing sentiment-bearing text in accordance with another embodiment of the present invention.

FIG. 4A is a block diagram of system 500 which corresponds to another embodiment of a text processing system 500 in accordance with the present invention. It will be noted that the items in system 500 are similar to those shown in system 200 of FIG. 2A, and similar items are similarly numbered. However, the order in which the items appear in the pipeline has been shifted.

In system 500, the placement of sentiment analyzer 208 and subject matter clustering component 206 is exchanged in the data processing pipeline. Of course, it will be appreciated that systems 200 and 500 can actually be the same system wherein the routing of data through the pipeline is simply reconfigurable or selectable by the user.

Figure 4B:
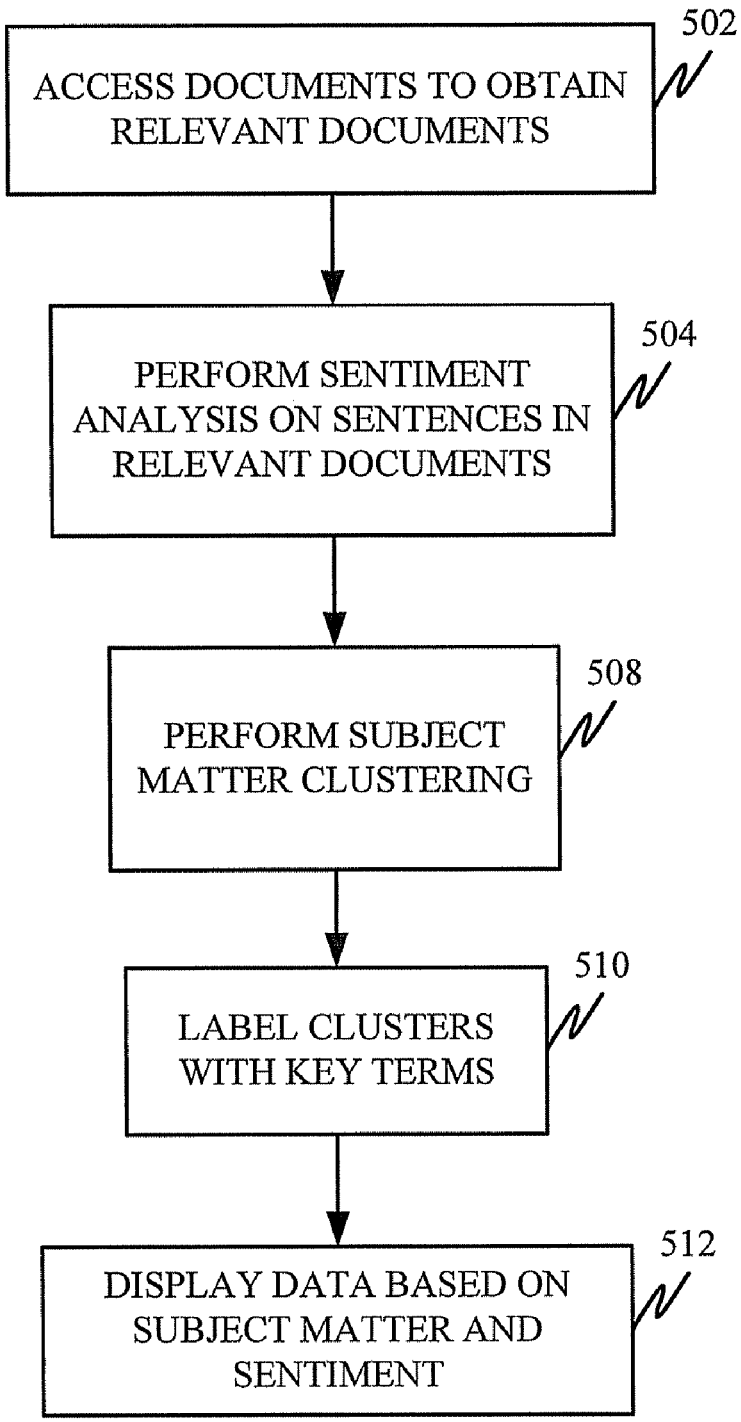
FIG. 4B is a flow diagram illustrating the operation of the system shown in FIG. 4A.

The operation of system 500 is illustrated by the flow diagram shown in FIG. 4B. First, relevant documents 222 are obtained from data store 202. This is done in the same way as described with respect to system 200 shown in FIG. 2A and is indicated by block 502 in FIG. 4B. Next, sentiment analyzer 208 processes relevant documents 222 to analyze the sentiment of the sentences (or other linguistic units) in those documents. This is indicated by block 504 in FIG. 4B. The result is sentiment-classified data 506. Therefore, all of the sentences (or other linguistic units) in relevant documents 222 have been classified according to their sentiment and this data is provided as sentiment-classified data 506.

Next, subject matter clustering component 206 clusters the sentiment-classified data 506 according to subject matter to provide clustered, sentiment-classified data 226. This is indicated by block 508 in FIG. 4B.

In one embodiment, the clusters are again labeled with key terms that show the words used in performing the subject matter clustering. This is indicated by block 510 in FIG. 4B.

Data 226 is again provided to report generation component 210 which processes the data into desired report formats, and the processed data is provided to display component 212 for display to the user. This is indicated by block 512 in FIG. 4B.

Of course, as with respect to system 200, data store 213 can be used to store data 226. Data store 213 can also be the same store from which data to be processed in system 500 (e.g., relevant documents 222 or sentiment-classified data 506) is retrieved. After the data is subjected to further processing, it can be returned to data store 213.

It will be noted with respect to FIG. 4A that the sentiment-classified data 506 can optionally be provided to report generation component 212. This allows the user to identify information which is different than that described with respect to system 200 in FIG. 2A. Since sentiment-classified data 506 contains classifications for all of the sentences in the relevant documents 222 according to sentiment, the user, by invoking report generation component 210, can process that data to identify, for example, the five things that people like most about the product under analysis. The user can also find the five things that people like least, or the things that are most intensely liked or disliked by customers. Of course, a wide variety of other information can be generated as well. These are given by way of example only, and it is to be understood that they do not limit the scope of the invention. Instead, it is simply noted that with respect to system 500 in FIG. 4A, both the fully clustered sentiment-classified data 226 and the sentiment-classified data 506 are provided to report generation component 210 where the information can be processed into different report formats, based on the user's desires.

The present invention also provides a system by which sentiment analyzer 208 can be trained. This is shown by the flow diagram set out in FIG. 5. First, features such as unigrams and bi-grams are extracted from all sentences in the data set. This is indicated by block 601. The features may include, for instance, unigrams and bi-grams, or certain key words that have been identified as indicating sentiment. The features used can be empirically (or otherwise) determined. Then a subset of the sentences in documents 202 is extracted as training data. This is indicated by block 602 in FIG. 5. Manual annotation of sentiment labels in the extracted sentences is indicated by block 604 in FIG. 5.

The annotated training data is then provided to a training component to train sentiment analyzer 208. In one embodiment, sentiment analyzer 208 is a classifier, such as a naïve Bayes classifier, a support vector machine or a decision tree classifier. In any case, the training component trains the sentiment analyzer using a known training technique. Training the sentiment classifier is indicated by block 606 in FIG. 5. Optionally a bootstrapping technique by which data is re-fed into the training component may be employed to train the sentiment analyzer without the need for a large volume of annotated data. Annotating previously un-annotated data is indicated by block 607A and training the classifier using all annotated data is indicated by block 607B.

The training component trains sentiment analyzer 208 to distinguish between positive, negative and neutral sentiment, as well as a confidence measure indicative of how confident analyzer 208 is in attributing the sentiment. The training component optionally iterates over the training data until the joint probability of the test data and the classifier parameters is maximized. This iterative process is indicated by block 608 in FIG. 5.

Finally, the most salient features that were used in training the sentiment analyzer 208 are optionally removed from use in the search/mining engine 204 or the subject matter clustering component 206, or both components 204 and 206. The reason that the features in sentiment analyzer 208 are removed from the other processing components is to ensure that sentiment classification is orthogonal to the other processes (i.e. to ensure that clustering does not use sentiment-bearing terms as discriminating factors.) In other words, if the data is already sifted based on the sentiment analysis features by analyzer 208, the data need not be sifted based on those same features in either the search/mining engine 204 or the subject matter clustering component 206. Removing the features in this way is indicated by block 610 in FIG. 5.

In accordance with yet another embodiment of the present invention, user feedback component 612 (shown in phantom in FIG. 4A) is provided to assist in training sentiment analyzer 208 during runtime. User feedback component 612 can, for example, be implemented as a simple user responsive interface. If the user reviews a sentence during runtime that is displayed as having a positive sentiment, but it actually has a negative or neutral sentiment, the user can provide a correction input by simply flagging the sentence and indicating that it has been misclassified, and possibly indicating its proper classification, through user feedback component 612 and display component 212. This user feedback is illustratively fed back to sentiment analyzer 208. This allows sentiment analyzer 208 to learn from the user feedback and re-train its classifiers based on the user feedback. Basically, the user feedback acts as further annotated training data which sentiment analyzer 208 can use to re-train itself. Of course, the re-training can be undertaken immediately upon receipt of user feedback, or the user feedback can be stored until a desired volume of user feedback has been received, at which time re-training can be initiated.

Because the sentiment analyzer 208, in accordance with one illustrative embodiment of the present invention, is machine trained, it can be trained, if desired by the user, according to different domains. For instance, the words used to express sentiment in different domains can be wildly different, depending on the domain. A wine tasting domain may consider the term "hint of oak" to indicate positive or a negative sentiment. This might have no meaning in the medical domain, however. Therefore, because sentiment classifier 208 is machine trained, it can quickly accommodate such domain-specific sentiment expressions to allow for more accurate sentiment analysis in different domains.

The present invention is also highly useful in multi-language environments. For instance, if the manufacturer of a product resides in a country that predominantly speaks a first language (language A) but the product is rolled out internationally, users may provide feedback in one or more different languages (such as language B). If the product evaluation personnel at the manufacturing company do not speak language B and need to have any relevant user feedback translated, this can be a prohibitively expensive task.

However, the present invention can be used to quickly identify a subset of the information in language B that actually needs to be translated. For example, it may be that the product evaluation personnel at the manufacturing company only need to see those sentences in language B that express strong negative sentiment. Therefore, since those sentences will be immediately identifiable using the present invention, only a certain, relatively small, subset of sentences needs to be translated from language B into language A. Thus, the present invention provides significant savings over prior systems which did not so readily classify the sentiment and the intensity of the sentiment.

Of course, while one embodiment of the present invention uses a machine learned sentiment analyzer, a more naive approach is still within one aspect of the present invention. For instance, bootstrapping need not be used. Another naïve approach simply classifies sentiment based on a predefined list of adjectives. Other more simple approaches can be used as well.

In accordance with yet another embodiment of the present invention, the user display 400 shown in FIG. 3 provides a view that indicates changes in sentiment over time. Therefore, at a quick glance, the user can determine whether the overall user sentiment regarding a certain feature has been growing more positive or more negative over time. This can be done for an overall product, a feature of a product, or any combination of features for a given product, or even for a company as a whole. It can be done using a multi-dimensional display in which one dimension is time and another is sentiment, or using a graphical illustration, or otherwise. This is particularly helpful in tracking whether the redesign of a product addresses consumer complaints adequately, or to determine whether a given marketing campaign is working, etc.

It should also be noted that the data processing of systems 200 or 500 can be intermittently updated. For instance, it may be that the features of a product discussed by product reviewers or consumers may change over time. Therefore, the clusters and sentiment may change over time as well. Thus, the search and mining engine 204 illustratively updates the data used by systems 200 and 500 intermittently so that the clusters and sentiment reflect the current opinion of consumers.

Although the present invention has been described with reference to particular embodiments, workers skilled in the art will recognize that changes may be made in form and detail without departing from the spirit and scope of the invention.

What is claimed is:

1. A computer-implemented method of processing text included in multiple product reviews of a single product, comprising:

utilizing a computer processor that is a component of the computer to cluster sub-document linguistic units included in a collection of relevant documents into a set of clusters based on pre-defined clustering criteria, wherein each relevant document in the collection contains text that is a review of the single product, and wherein each cluster in the set represents a different attribute of the single product, and wherein the pre-defined clustering criteria is a listing of key words defined before the computer processor clusters the sub-document linguistic units into the set of clusters, and wherein the listing of key words includes a separate group of key words for each said different attribute of the single product such that when the processor clusters the sub-document linguistic units into the set of clusters it does so by determining which of the listing of key words are included in which sub-document linguistic units;

assigning a sentiment and a confidence measure to each sub-document linguistic unit, wherein for each sub-document linguistic unit the confidence measure is a measurement of a confidence with which the sentiment was assigned;

generating a display including a direct indication of the sub-document linguistic units, the cluster in the set to which each sub-document linguistic unit was clustered by the computer processor, and the sentiment assigned to each sub-document linguistic unit;

wherein generating the display further comprises generating the display so as to also include a user input mechanism that receives user-initiated selection of a minimum confidence level that the confidence measure attributed to each sub-document linguistic unit must exceed for a sub-document linguistic unit to be included by the computer processor within any of the clusters;

excluding a particular one of the sub-document linguistic units from being included in any cluster in the set based on a determination that the confidence measure assigned to the particular sub-document linguistic unit is less than the minimum confidence level received by the user input mechanism; and wherein generating the display further comprises generating the display so as to also include an indication of which of the listing of key words were used by the computer processor as a basis for clustering the sub-document linguistic units.

2. The method of claim 1 and further comprising:
identifying the relevant documents as a subset of documents from a larger set of documents based on key words provided by a user as input into a search engine.

3. The method of claim 1, wherein generating the display further comprises:
generating the display so as to include a box for each cluster in the set, wherein a particular one of said boxes changes sizes in response to receipt by the input mechanism of the minimum confidence level, and wherein the receipt by the input mechanism of the minimum confidence level also triggers a change in a quantity of sub-document linguistic units represented within said particular one of the boxes.

4. The method of claim 3, wherein generating the display further comprises:
generating the display so as to include a visual indication of an overall representative sentiment of each cluster in the set, wherein the overall representative sentiment for the cluster associated with the particular box is indicated by a shading of the particular box.

5. The method of claim 1 wherein assigning a sentiment to each sub-document linguistic unit occurs before the computer processor clusters the sub-document linguistic units.

6. A computer-implemented method of generating a display that presents text associated with multiple product reviews of a single product, comprising:

receiving from a user an indication of features of the single product for which the user desires sentiment analysis;

utilizing a computer processor that is a component of the computer to cluster sub-document linguistic units of relevant documents into clusters, wherein each of the clusters corresponds to one of the features for which the user desires sentiment analysis;

assigning a sentiment and a confidence measure to each sub-document linguistic unit, wherein for each sub-document linguistic unit the confidence measure is a measurement of a confidence with which the sentiment was assigned;

generating the display so as to include an indication of the sub-document linguistic units, a cluster to which each sub-document linguistic unit was assigned by the computer processor, a sentiment attributed to each sub-document linguistic unit, an overall sentiment attributed to each of the clusters, and the features of the single product for which the user desires a sentiment analysis; and wherein generating the display further comprises generating the display so as to include a user input mechanism that receives a user-initiated selection of a minimum confidence level that the confidence measure attributed to each sub-document linguistic unit must exceed for a sub-document linguistic unit to be included by the computer processor within any of the clusters, and wherein generating the display further comprises generating the display so as to include a plurality of boxes, wherein at least one of the plurality of boxes changes sizes in response to receipt by the user input mechanism of the minimum confidence level.

7. The method of claim 6 wherein generating the display further comprises generating the display so as to include a plurality of tabs that are each associated with a particular sentiment, wherein actuating a particular one of the plurality of tabs causes sub-document linguistic units corresponding to the sentiment associated with the particular tab to be displayed in one of the plurality of boxes.

8. The method of claim 7, wherein generating the display further comprises generating the display so as to indicate a change in sentiment over time.

9. The method of claim 8 wherein indicating a change in sentiment over time comprises indicating a change in sentiment over time in a multidimensional display in which one dimension is time and another dimension is sentiment.

* * * * *